(12) United States Patent
Müller et al.

(10) Patent No.: US 11,014,764 B2
(45) Date of Patent: May 25, 2021

(54) APPARATUS FOR ALIGNING BOX-SHAPED ARTICLES OF VARIOUS SIZES ON A CONVEYOR BELT, PRINTING STATION, READING STATION, AND LABELLING STATION INCLUDING SAME

(71) Applicant: SICPA HOLDING SA, Prilly (CH)

(72) Inventors: Urs Müller, Fanas (CH); Tobias Scherer, Inwil (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/766,086

(22) PCT Filed: Nov. 21, 2018

(86) PCT No.: PCT/EP2018/082021
§ 371 (c)(1),
(2) Date: May 21, 2020

(87) PCT Pub. No.: WO2019/101772
PCT Pub. Date: May 31, 2019

(65) Prior Publication Data
US 2020/0354157 A1    Nov. 12, 2020

(30) Foreign Application Priority Data

Nov. 21, 2017  (EP) .................................... 17202891

(51) Int. Cl.
*B65G 47/22*       (2006.01)
*B65C 9/02*        (2006.01)
(Continued)

(52) U.S. Cl.
CPC ............. *B65G 47/22* (2013.01); *B41J 11/007* (2013.01); *B65C 1/02* (2013.01); *B65C 9/02* (2013.01);
(Continued)

(58) Field of Classification Search
CPC .... B65G 47/22; B65G 15/16; B65G 21/2072; B65G 2201/025; B65G 2203/0233;
(Continued)

(56) References Cited

U.S. PATENT DOCUMENTS 3,792,234 A  *  2/1974  Sturzenegger ......... B65G 47/22
                                                    235/483
10,583,998 B2 *  3/2020  Wenger ................ B65G 47/244
(Continued)

FOREIGN PATENT DOCUMENTS

FR       2109705        5/1972
WO    2009061981        5/2009
WO    2016069190        5/2016

OTHER PUBLICATIONS

International Search Report along with the Written Opinion of the ISA issued with respect to application No. PCT/EP2018/082021.

*Primary Examiner* — Gene O Crawford
*Assistant Examiner* — Lester Rushin, III
(74) *Attorney, Agent, or Firm* — Muncy, Geissler, Olds & Lowe, P.C.

(57) ABSTRACT

The invention relates to an apparatus for aligning box-shaped articles of various sizes on a conveyor belt, as well as a printing station, a reading station, and a labelling station including said apparatus. The apparatus comprises an input conveyor belt operable to move transversally with respect to an output conveyor belt conveying direction, to adapt to a transverse size of a transported box-shaped article, and feed said output conveyor belt with corresponding aligned article.

16 Claims, 5 Drawing Sheets

(51) Int. Cl.
    *B65G 15/16*     (2006.01)
    *B65G 21/20*     (2006.01)
    *B41J 11/00*     (2006.01)
    *B65C 1/02*     (2006.01)

(52) U.S. Cl.
    CPC ......... *B65G 15/16* (2013.01); *B65G 21/2072* (2013.01); *B65G 2201/025* (2013.01); *B65G 2203/0233* (2013.01); *B65G 2207/08* (2013.01)

(58) Field of Classification Search
    CPC ...... B65G 2207/08; B41J 11/007; B65C 1/09; B65C 9/02; B65C 9/09
    USPC ....................................................... 198/345.1
    See application file for complete search history.

(56)              References Cited

U.S. PATENT DOCUMENTS 2012/0261231 A1     10/2012     Eiserloh et al.
2017/0334663 A1*   11/2017     Ragan .................... B65G 54/02

* cited by examiner

APPARATUS FOR ALIGNING BOX-SHAPED ARTICLES OF VARIOUS SIZES ON A CONVEYOR BELT, PRINTING STATION, READING STATION, AND LABELLING STATION INCLUDING SAME

TECHNICAL FIELD

The present invention relates to the technical field of conveying systems for transporting items on distribution/production lines, and printing or reading data, or applying labels on items transported on these lines.

BACKGROUND ART

A distribution or production line for transporting batches of articles on a conveying plane usually comprises a station equipped with a print head for printing data (e.g. product information, logo etc.) on the articles, or a reader for reading data printed on the articles (e.g. a camera for reading printed barcodes or for quality control purpose): a precise positioning of the articles on the conveying plane of the line is then required for allowing accurate printing or reading operations. In case the articles of a batch have all a same size, conventional lines use suitably disposed rail guides (and control of transport speed) set for guiding and positioning the articles e.g. in front of a print head of a printer for printing data of some part of a surface of the articles. However, in case the line transports batches of different article types, i.e. the sizes of the articles within two consecutive batches differ, then the line must be stopped after treatment of the first batch to modify and set the positions of the rail guides, and also the position of the print head or the reader, as well as the width of the conveying plane, in order to accurately process the second batch.

In case the line transports articles of different sizes, some adaptable alignment mechanisms (e.g. with size sensors and moveable guiding rails, or moveable print head or reader) are available for automatically adapting the guiding operations. However, these alignment mechanisms generally necessitates a step of fine tuning of the distance of the print head, respectively the reader (and some sensors), to respectively print or read data on the articles. These setting operations can take a substantial time, particularly if several operations are combined: i.e. different parts of the articles must be printed (with a plurality of print heads) or read. Moreover, such alignment mechanisms are not well suited for guiding articles of which size varies over a great range. This is typically the case, for example, with the pharma production/distribution lines wherein box-shaped articles having greatly differing sizes must be transported on belt conveyors. Moreover, data must be printed, or read, on different faces of the box-shaped articles (e.g. on labels), and often at different places on a face, to comply with some various identification/security/information rules (possibly further depending on several national regulations). These constraints result in an increased complexity of the line: it is often necessary to have a plurality of printing or reading stations along the line, or to have specific drive mechanisms for moving the print heads or the readers. This is also the case for postal packages, for example. The above remarks also apply to the operations of a labelling unit of a labelling station, for accurately apply labels on the articles.

Thus, there is a need for a device capable to automatically align box-shaped articles of variable size on a conveyor belt in order to allow accurate printing and/or reading operations on a plurality of faces of these articles.

There is also a need for a printing station including the above mentioned alignment device and further capable to accurately print data on faces of variable-size box-shaped articles transported on the conveyor belt, with a simplified and efficient positioning mechanism of the print head(s).

Likewise, there is a need for a reading station including the above mentioned alignment device and further capable to accurately read data on faces of variable-size box-shaped articles transported on the conveyor belt, with a simplified and efficient positioning mechanism of the reader(s).

Also, there is a need for a labelling station including the above mentioned alignment device and further capable to accurately apply labels on at least one of the faces of variable-size box-shaped articles transported on the conveyor belt.

It is therefore an object of the invention to solve the above mentioned limitations of the prior art and provide an apparatus for automatically aligning box-shaped articles of variable size on a conveyor belt.

It is a further object of the invention to provide a printing, resp. reading, station including the above mentioned apparatus and further capable to accurately print, resp. read, data on one or several faces of variable-size box-shaped articles transported on the conveyor belt, with a simplified and efficient positioning of the print head(s), resp. reader(s).

Another object of the invention is to provide a labelling station including the above mentioned apparatus and further capable to accurately a label on one or several faces of variable-size box-shaped articles transported on the conveyor belt, with a simplified and efficient positioning of the labeling unit of this labeling station.

SUMMARY OF THE INVENTION

According to one aspect the invention relates to an apparatus for aligning box-shaped articles of various sizes in a conveying direction on a conveyor belt, comprising:
- an output conveyor having output conveyor drive means and an output conveyor belt operable to transport said box-shaped articles in the conveying direction, with a guide member fastened to the output conveyor and allowing a face of a box-shaped article transported on the output conveyor belt to slide along it in the conveying direction, the guide member having a guiding portion extending beyond an entrance extremity of the output conveyor belt;
- an input conveyor having input conveyor drive means and an input conveyor belt, coplanar with the output conveyor belt, operable to transport the article in said conveying direction with said face of the transported article sliding along the guiding portion of the guide member, and deliver the article to the entrance of the output conveyor belt, the input conveyor including an input guide member disposed on a side of the input conveyor belt opposite to the guiding portion and facing the guiding portion, and fastened to the input conveyor, the input guide member allowing an opposite face of the box-shaped article transported on the input conveyor belt to slide along it in the conveying direction,
- wherein the input conveyor has further drive means operable to move the input conveyor belt in translation in a direction perpendicular to the conveying direction and make the input guide member to push the transported article against the guiding portion.

The guiding portion of the guide member may be elevated above a conveying plane defined by the output conveyor belt, and the further drive means may be operable to make a part of the input conveyor belt to pass underneath the guiding portion.

In a variant, the above apparatus may further comprise an input guide member extension fastened to the input guide member, aligned with the input guide member, extending above the conveying plane of the output conveyor belt and facing the guide member, said input guide member extension being operable to slidingly guide a box-shaped article transferred from the input conveyor belt to the output conveyor belt by maintaining it in contact with the guide member.

The apparatus according to the invention, may further comprise a top guiding member disposed above a portion of the output conveyor belt and top drive means operable to make the top guide member to move in translation in a direction perpendicular to said portion of the output conveyor belt, and make the top guiding member to press on a top face of the box-shaped article transported on said portion of the output conveyor belt. Moreover, the top guiding member is preferably disposed at the level of the entrance extremity of the output conveyor belt and further extends above a portion of the input conveyor belt. This top guiding member is more preferably a top conveyor belt of a top conveyor.

According to another aspect, the invention relates to a printing station for printing on box-shaped articles of various sizes, comprising:
   the apparatus for aligning box-shaped articles of various sizes in a conveying direction on a conveyor belt according to the invention, possibly in the variant including the guide member elevated above the conveying plane defined by the output conveyor belt or the variant comprising an input guide member extension fastened to the input guide member;
   a print head of a printer operable to print on a face of a box-shaped article aligned by said apparatus on the input conveyor belt, the print head being mounted on a support being one of the guiding portion of the guide member, for printing on a first side face of the box-shaped article abutting said guiding portion, and the input guide member, for printing on a second side face of the box-shaped article opposite to the first side face and abutting said input guide member; and
   a control unit having a processing unit and being connected to the printer, the input conveyor and the output conveyor, operable to control the printer and motion of the input conveyor belt and the output conveyor belt to print data on the face of the box-shaped article abutting the support.

In a variant of the printing station, wherein it includes the apparatus for aligning box-shaped articles of various sizes in a conveying direction on a conveyor belt according to the invention further comprising the top guiding member disposed above a portion of the output conveyor belt with its top drive means, as described above, the printing station also comprises:
   a print head of a printer operable to print on a face of a box-shaped article aligned by said apparatus on the output conveyor belt, the print head being mounted on a support being one of the guide member, for printing on a side face of the box-shaped article transported on the output conveyor belt abutting said guide member, and the top guiding member, for printing on a top face of the box-shaped article transported on the output conveyor belt abutting said top guiding member; and
   a control unit having a processing unit and being connected to the printer, the input conveyor, the output conveyor, and the top drive means, operable to control the printer and motion of the input conveyor belt, the output conveyor belt and the top guiding member to print data on the face of the box-shaped article abutting the support.

According to another aspect, the invention relates to a reading station for reading data on box-shaped articles of various sizes, comprising:
   the apparatus for aligning box-shaped articles of various sizes in a conveying direction on a conveyor belt, according to the invention, possibly in the variant including the guide member elevated above the conveying plane defined by the output conveyor belt or the variant comprising an input guide member extension fastened to the input guide member;
   a reader operable to read data on a face of a box-shaped article aligned by said apparatus on the input conveyor belt, the reader being mounted on a support being one of the guiding portion of the guide member, for reading data on a first side face of the box-shaped article abutting said guiding portion, and the input guide member, for reading data on a second side face of the box-shaped article opposite to the first side face and abutting said input guide member; and
   a control unit having a processing unit and being connected to the reader, the input conveyor and the output conveyor, operable to control the reader and motion of the input conveyor belt and the output conveyor belt to read data on the face of the box-shaped article abutting the support.

In a variant of the reading station, wherein it includes the apparatus for aligning box-shaped articles of various sizes in a conveying direction on a conveyor belt according to the invention further comprising the top guiding member disposed above a portion of the output conveyor belt with its top drive means, as described above, the reading station also comprises:
   a reader operable to read data on a face of a box-shaped article aligned by said apparatus on the output conveyor belt, the reader being mounted on a support being one of the guide member, for reading data on a side face of the box-shaped article transported on the output conveyor belt abutting said guide member, and the top guiding member, for reading data on a top face of the box-shaped article transported on the output conveyor belt abutting said top guiding member; and
   a control unit having a processing unit and being connected to the reader, the input conveyor, the output conveyor, and the top drive means, operable to control the reader and motion of the input conveyor belt, the output conveyor belt and the top guiding member to read data on the face of the box-shaped article abutting the support.

According to a further aspect, the invention relates to a labelling station for applying labels on box-shaped articles of various sizes, comprising:
   the apparatus for aligning box-shaped articles of various sizes in a conveying direction on a conveyor belt, according to the invention;
   a labelling unit operable to apply a label on a face of a box-shaped article aligned by said apparatus on the input conveyor belt, the labelling unit being fastened to a support being one of the guiding portion of the guide member, for applying the label on a first side face of the box-shaped article abutting said guiding portion, and the input guide member, for applying the label on a second side face of the box-shaped article opposite to the first side face and abutting said input guide member; and a control unit having a processing unit and being connected to the labeling unit, the input conveyor and the output conveyor, operable to control the labeling unit and motion of the input conveyor belt and the output conveyor belt to apply the label on the face of the box-shaped article abutting the support.

In a variant of the labelling station, wherein it includes the apparatus for aligning box-shaped articles of various sizes in a conveying direction on a conveyor belt according to the invention further comprising the top guiding member disposed above a portion of the output conveyor belt with its top drive means, as described above, the labelling station also comprises:

a labelling unit operable to apply a label on a face of a box-shaped article aligned by said apparatus on the output conveyor belt, the labelling unit being fastened to a support being one the guide member, for applying the label on a side face of the box-shaped article transported on the output conveyor belt abutting said guide member, and the top guiding member, for applying the label on a top face of the box-shaped article transported on the output conveyor belt abutting said top guiding member; and a control unit having a processing unit and being connected to the labeling unit, the input conveyor, the output conveyor, and the top drive means, operable to control the labeling unit and motion of the input conveyor belt, the output conveyor belt and the top guiding member to apply the label on the face of the box-shaped article abutting the support.

The invention also relates to a production or distribution line equipped with a belt conveyor for transporting box-shaped articles on a conveyor belt, comprising one of: the apparatus for aligning box-shaped articles of various sizes in a conveying direction on a conveyor belt according to the invention, the printing station for printing on box-shaped articles of various sizes according to the invention, the reading station for reading data on box-shaped articles of various sizes according to the invention, and the labelling station for applying labels on box-shaped articles of various sizes according to the invention.

The present invention will be described more fully hereinafter with reference to the accompanying drawings in which like numerals represent like elements throughout the different figures, and in which prominent aspects and features of the invention are illustrated.

DETAILED DESCRIPTION

An illustrative embodiment of an apparatus for aligning box-shaped articles of various sizes in a conveying direction on a conveyor belt is disclosed in reference to FIGS. 1 to 4.

Figure 1:
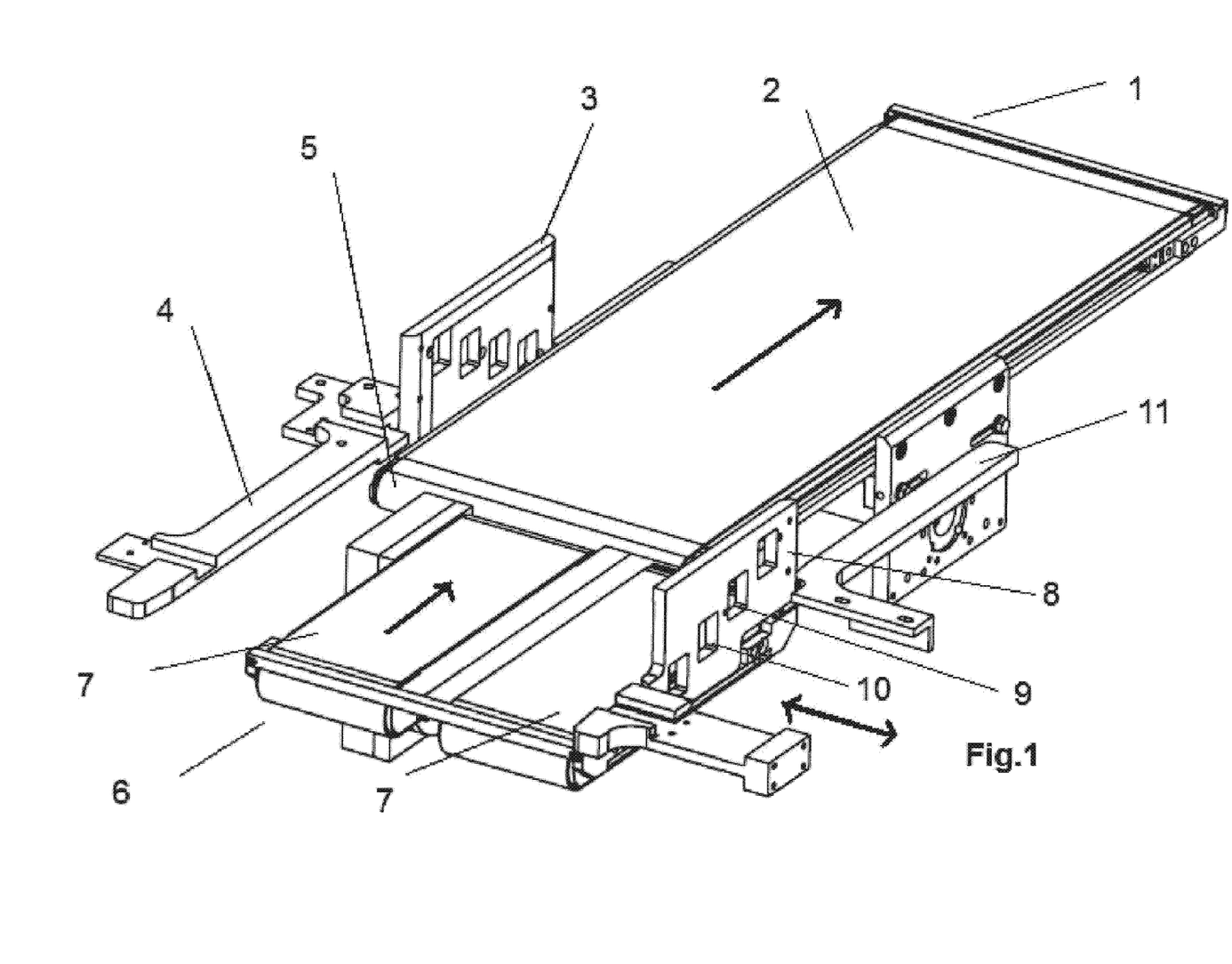
FIG. 1 is a schematic view in perspective of an apparatus for aligning box-shaped articles of various sizes according to a preferred embodiment of the invention.

FIG. 1 shows an output conveyor (1) with a plane output conveyor belt (2) and output conveyor drive means (not shown) capable to move the output conveyor belt (2) in a conveying direction represented by an arrow on the belt. A guide member (3), here in a form of a guiding rail disposed on a side of the belt, allows maintaining aligned the box-shaped articles transported on the output conveyor belt (see Fig.). A guiding portion (4) of the guide member (3) is fastened to the output conveyor (1) and disposed on the side of the output conveyor belt corresponding to that of the guide member (3), and extends beyond an entrance extremity (5) of the output conveyor belt (2). The guiding portion (4) has here a part with a flat blade shape elevated above the conveying plane of the output conveyor belt and parallel to it. An input conveyor (6), here comprising a pair of coplanar parallel input conveyor belts (7), also disposed in the conveying plane of the output conveyor belt (for a smooth transfer of articles from the input conveyor belt to the entrance extremity of the output conveyor belt), has input conveyor drive means (not shown) for moving the input conveyor belt (7) and transporting articles in the conveying direction. The input conveyor has further drive means (not shown) allowing to move in translation, in the conveying plane, the input conveyor belt (7) (as represented by a double arrow) along the entrance extremity (5). Here, the input conveyor belt can move in translation below the guiding portion (4). The input conveyor has an input guide member (8) fastened to the input conveyor (6), here represented as a plate with two through-holes (9, 10), and disposed on a side of the input conveyor belt (7) opposite to the guiding portion (4) and facing it: thus, when a box-shaped article is transported on the input conveyor belt (7), the further driving means can move in transverse translation the input conveyor belt and make the input guide member (8) to push the box-shaped article transported in the conveying direction against the guiding portion (4) and slide along it (and along the input guide member) toward the entrance extremity (5) of the output conveyor belt (2). The box-shaped article is thus smoothly passed to the output conveyor belt (2) and then can slide along the guide member (3) in the conveying direction. In this variant of the invention, the width comprised between the guiding portion (4) and the input guide member (8) can be reduced to practically zero by moving in transverse translation the input conveyor belt (7) and making it to pass below the guiding portion (4), until the input guide member (8) comes into contact with the guiding portion (4). By moving in transverse translation the input conveyor belt (7) so as to enlarge the width comprised between the guiding portion (4) and the input guide member (8) makes possible to transport box-shaped articles of very large width (this width can be even greater than the added respective widths of the output conveyor belt and the input conveyor belt). Thus, this translation mechanism of the input conveyor belt according to the invention allows transporting box-shaped articles of very different sizes, well aligned in the conveying direction and sufficiently maintained, by pushing with the input guide member (8) an article transported on the input conveyor belt (7) against the guiding portion (4) and making it to slide between the guiding portion (4) and the input guide member (8).

This mechanism also allows accurate operations of printing or reading or labelling, particularly on the side faces of box-shaped articles transported on the input conveyor belt (7) which are (slidingly) maintained aligned between the input guide member (8) and the guiding portion (4) of the guide member (3). For example, in case the apparatus is used in a printing station, with a printer attached to the input conveyor (6) so that a print head is fastened to the input guide member (8) and disposed at a level of, e.g., the hole (9) in the input guide member (8), to print through this hole on the face of a box-shaped article that is in contact with the input guide member (8): the precise positioning of the input guide member (8) against the face in contact with it, and, consequently, the precise positioning of the print head make unnecessary any further adjustment of the print head for printing data on that face.

Clearly, a printer could be mounted on the output conveyor (1) with a print head print head fastened to the guiding portion (4) and operable to print on the face of a box-shaped article that is in contact with the guiding portion (4): here too, the precise positioning of the guiding portion (4) against the face, and, consequently, the precise positioning of the print head make unnecessary any further adjustment (toward the face) of the print head for printing data on that face. This is a great advantage of the invention to make the printer(s) unitary with a conveyor and eliminate the need of specific printer driving means for positioning the print head toward the face to be printed. Another important advantage of the invention is that the print head can be disposed at any height, from the level of the input conveyor belt (7) to the top height of a transported box-shaped article, i.e. allowing printing on the face with zero offset. In a variant, instead of fixed holes (9, 10) through the input guide member (8), the input guide member (8) can be, for example, in two parts separated by a wide slit (possibly extending along a full height of the box-shaped article's face) allowing a print head fastened to the input guide member (8) to slide vertically (i.e. perpendicularly to the input conveyor belt (7)) in position along said wide slit, moved by means of an appropriate drive means, so as to print at different places on the face in contact with the input guide member (8): here too, the precise positioning of the print head makes unnecessary any further adjustment (toward the face) of the print head for printing data on that face. This configuration of the input guide member with a wide slit can be useful in case of a labelling station: e.g. if the labelling unit includes a linear roll-feed head, the reel with wrap-around labels can apply the labels through the slit.

All the above configurations of the print head of a printing station can be obviously transposed to the case of a reading station (the print head being replaced by a reader for reading data on the face, like a camera for example), or a labelling station (the print head being replaced by a labelling unit for applying labels on the face), and thus will not be further detailed.

Figure 2:
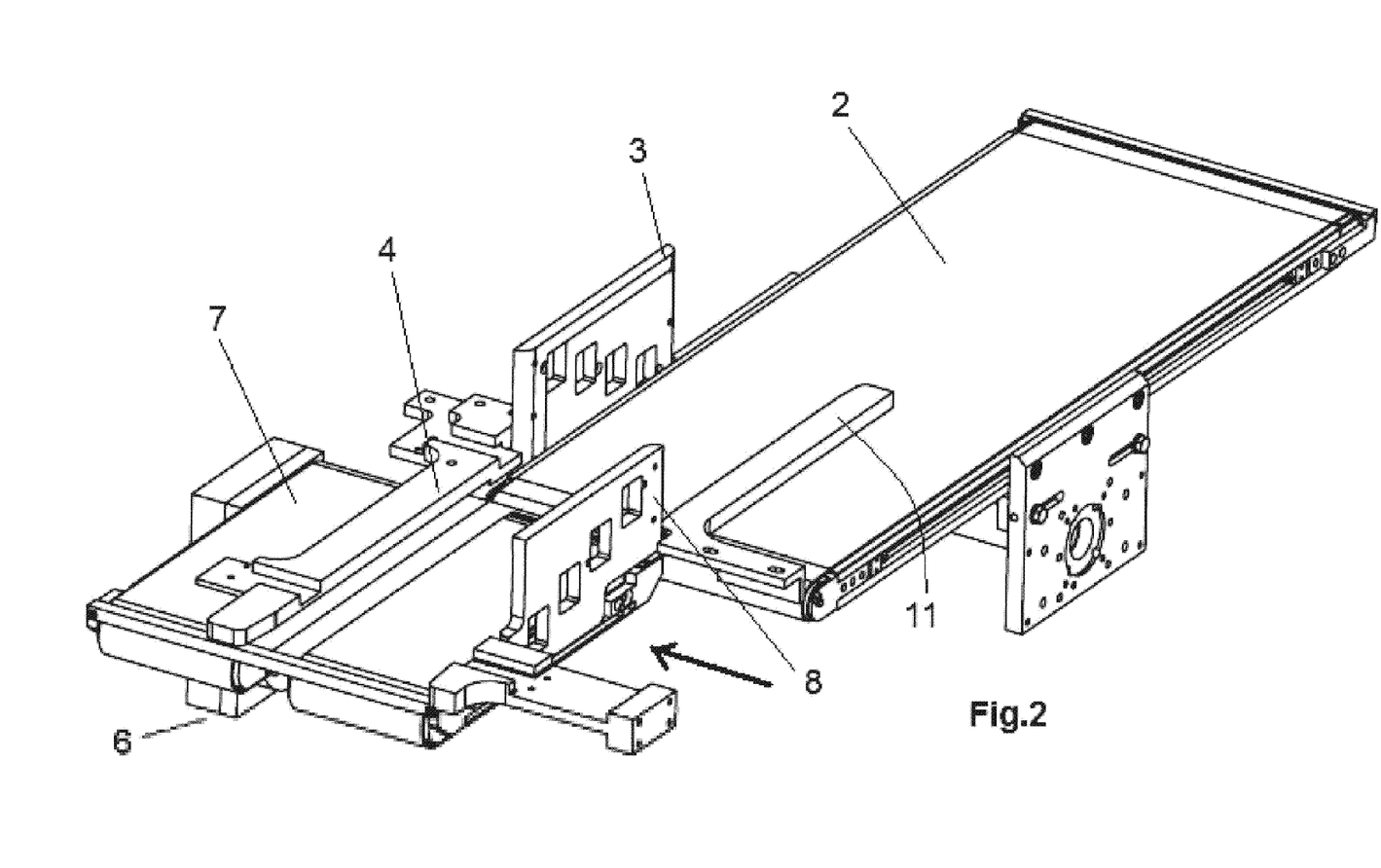
FIG. 2 illustrates a configuration of the apparatus for aligning box-shaped articles wherein the further drive means of the input conveyor has moved the input conveyor belt in transverse translation.

FIG. 2 illustrates a configuration of the apparatus for aligning box-shaped articles of various sizes in a conveying direction on a conveyor belt wherein the further drive means of the input conveyor (6) has moved the input conveyor belt (7) in transverse translation (with respect to the configuration of FIG. 1) to a position where a part of this input conveyor belt (7) is below the guiding portion (4) of the guide member (3). This illustrates the capacity of the apparatus to deal with box-shaped articles of very low transverse width. In a variant of the invention, the input guide member (8) has, fastened to it, an input guide member extension (11), aligned with the input guide member and extending above the conveying plane of the output conveyor belt (2), in front of the guide member (3), this input guide member extension (11) being operable to slidingly guide a box-shaped article (11) transferred from the input conveyor belt (7) to the output conveyor belt (2), crossing the entrance extremity (5), by maintaining it in (sliding) contact with the guide member (3). This variant is particularly advantageous in case, for example, a printer is attached to the output conveyor (1) with a print head fastened to the guide member (3), here represented with holes for allowing the print head to print on the face of a box-shaped article on the output conveyor belt (2) being pressed by the input guide member extension (11) against the guide member (3): here too, the precise positioning of the input guide member extension (11) against a face of the box-shaped article disposed on the output conveyor belt (2), and, consequently, the precise positioning of the print head with respect to the opposite face in contact with the guide member (3) make unnecessary any further adjustment (toward said opposite face) of the print head for printing data on that opposite face. Of course, the print head could also be fastened to the input guide member extension (11) so as to print on the face that is in contact with said input guide member extension (11) with the resulting same advantages.

Figure 3:
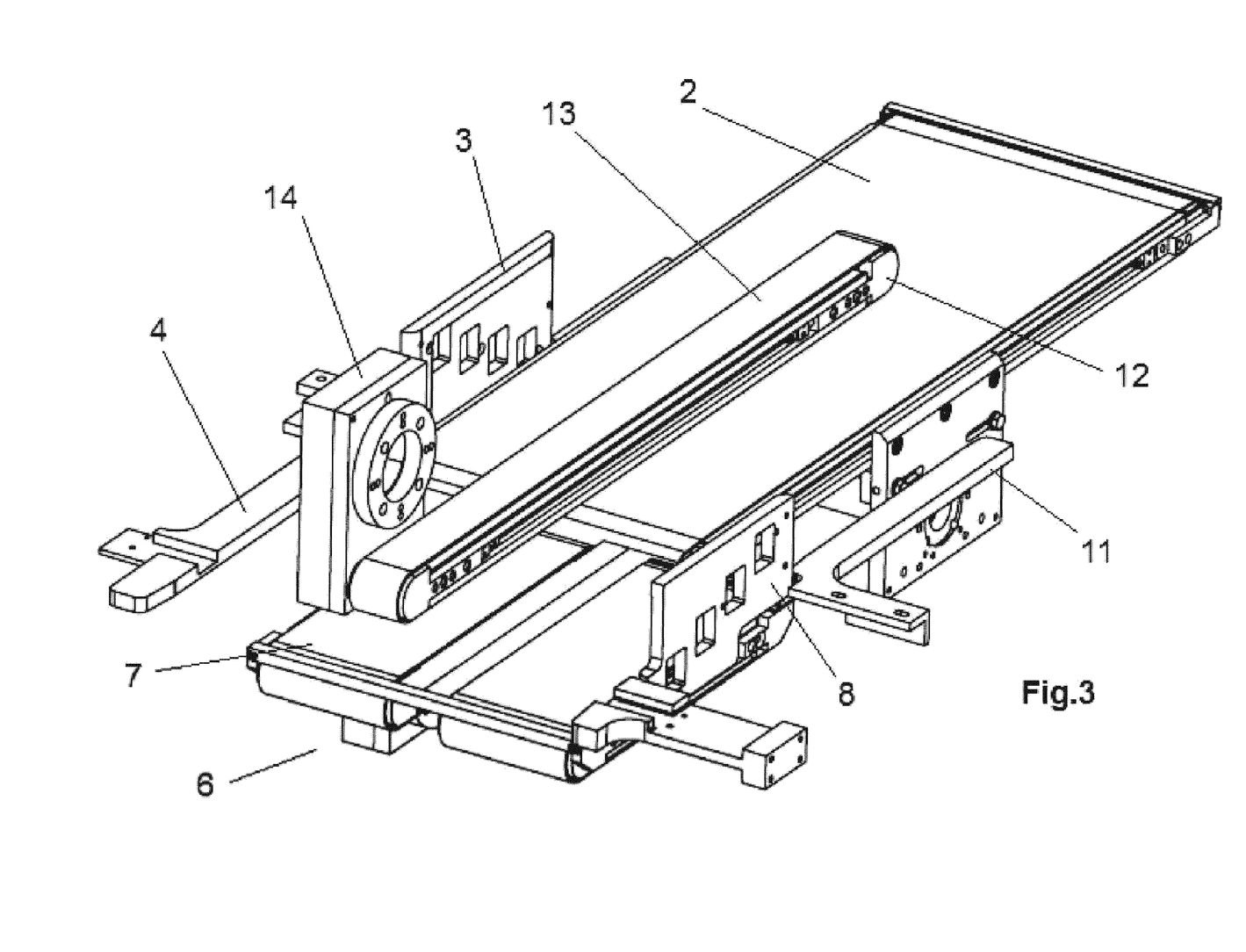
FIG. 3 illustrates an embodiment of the invention with a top guiding member disposed above both a portion of the output conveyor belt and a portion of the input conveyor belt.

FIG. 3 illustrates an embodiment of the invention wherein a top guiding member (12), here represented having a top conveyor belt (12), is disposed above both a portion of the output conveyor belt (2) and a portion of the input conveyor belt (7), with top drive means (not shown) operable to make the top guiding member (12) to move in translation in a direction perpendicular to said portion of the output conveyor belt (2), and make the top conveyor belt (13) to press on a top face of the box-shaped article transported on said portion of the output conveyor belt (2). This embodiment allows improving the way the articles are maintained on the output conveyor belt (13): this is particularly advantageous in case there is no input guide member extension (11). Also shown, a support member (14) for maintaining the top guiding member (12) above the output conveyor belt (2) and moving it vertically to make the top conveyor belt (13) to come into contact with a top face of a box-shaped article transported below on the conveyor belt.

In a variant of the printing station according to the invention including such a configuration of the apparatus for aligning the articles as shown of FIG. 3, a printer is attached to the top guiding member (12), with its print head disposed so as to print on the top face of a box-shaped article transported on the output conveyor belt (2), below the top guiding member.

Figure 4:
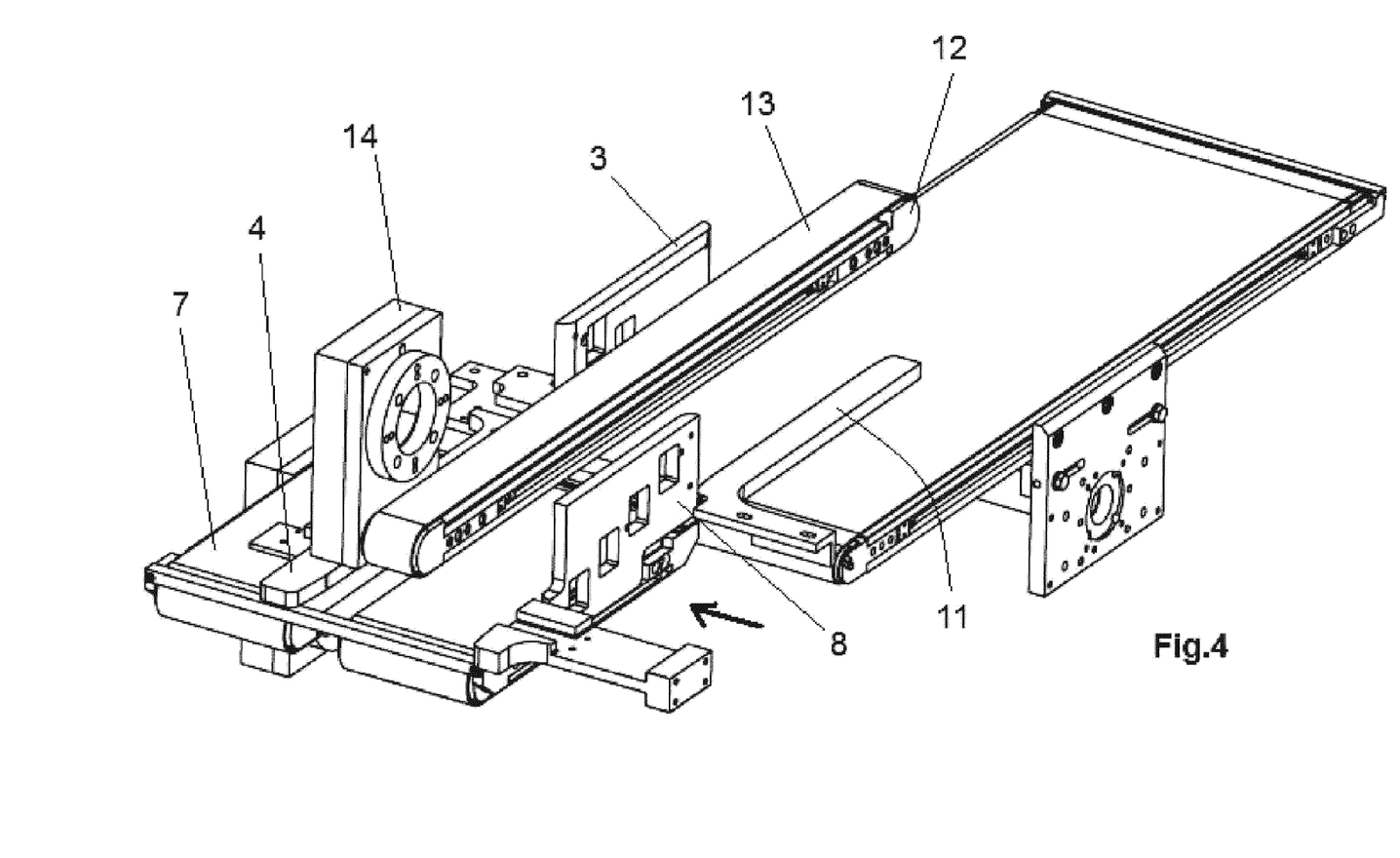
FIG. 4 illustrates a configuration of the apparatus for aligning box-shaped articles, as shown on FIG. 3, wherein the input conveyor belt has moved in transverse translation to a position where a part of this input conveyor belt is below the guiding portion of the guide member.

FIG. 4 illustrates a configuration of the apparatus for aligning box-shaped articles of various sizes in a conveying direction on a conveyor belt, as shown on FIG. 3, wherein the further drive means of the input conveyor (6) has moved the input conveyor belt (7) in transverse translation to a position where a part of this input conveyor belt (7) is below the guiding portion (4) of the guide member (3). This illustrates the capacity of the apparatus to deal with box-shaped articles of very low transverse width even in the variant involving a top guiding member.

Figure 5:
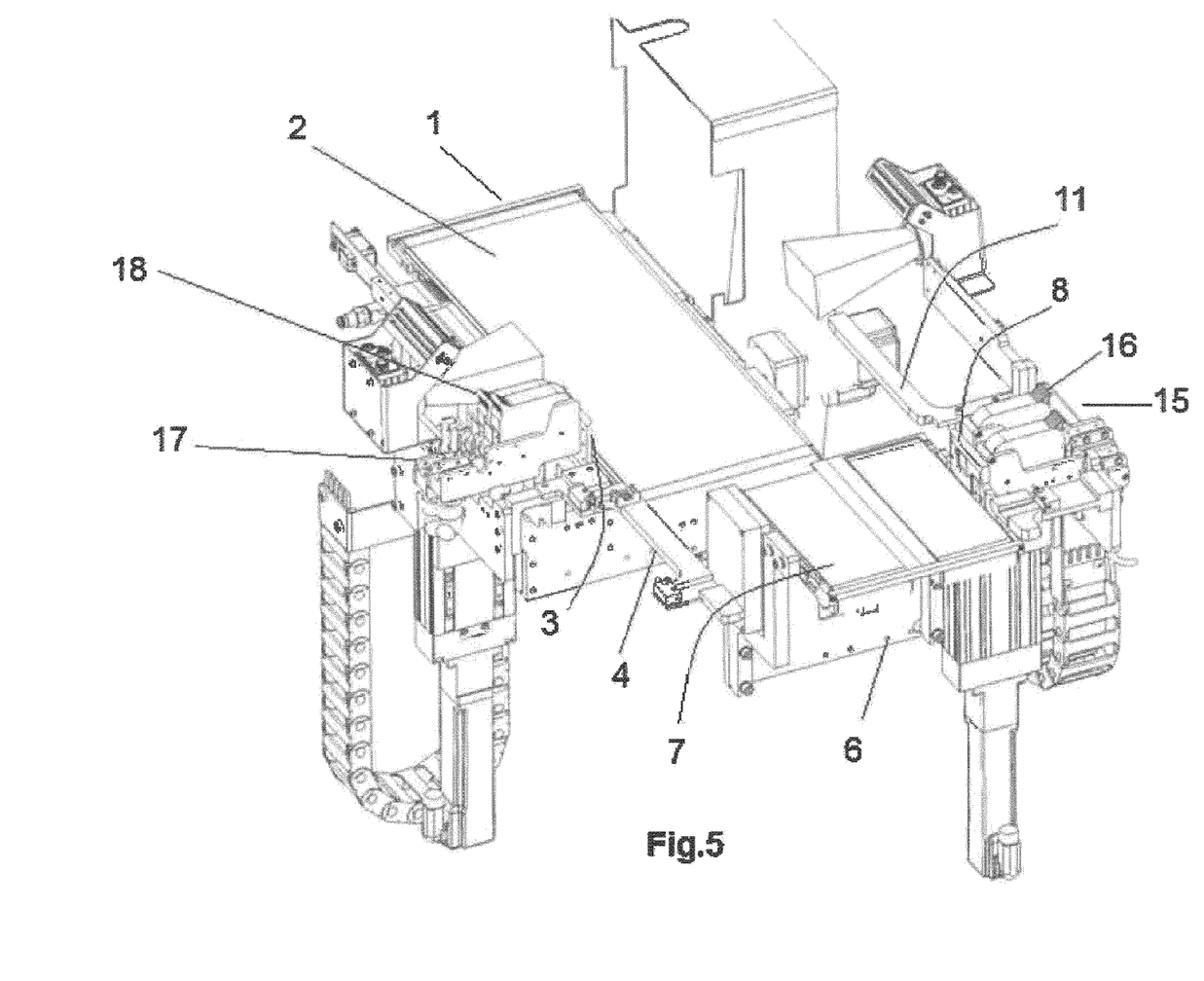
FIG. 5 is a view in perspective of an embodiment of a printing station according to the invention.

FIG. 5 is a view in perspective of an embodiment of a printing station according to the invention. A printer (15) is attached to the input conveyor (6) with two print heads disposed for printing through the holes (9, 10) in the input guide member (8), ink cartridges (16) for feeding these print heads are also shown. Another printer (17) is attached to the output conveyor (1) with its two print heads disposed for printing through the holes (see FIG. 1, the holes through the guide member (3)) in the guide member (3), corresponding ink cartridges (18) for feeding these two print heads are also shown.

All the above configurations of the print head(s) of the printing station can obviously be transposed to the case of a reading station (the print head being replaced by a reader for reading data on the face of the article, like a camera for example), or a labelling station (the print head being replaced by a labelling unit for applying labels on the face of the article), and thus will not be further detailed.

The above disclosed subject matter is to be considered illustrative, and not restrictive, and serves to provide a better understanding of the invention defined by the independent claims.

The invention claimed is:

1. An apparatus for aligning box-shaped articles of various sizes in a conveying direction on a conveyor belt, comprising:
    an output conveyor having output conveyor drive means and an output conveyor belt operable to transport said box-shaped articles in the conveying direction, with a guide member fastened to the output conveyor and allowing a face of a box-shaped article transported on the output conveyor belt to slide along it in the conveying direction, the guide member having a guiding portion extending beyond an entrance extremity of the output conveyor belt;
    an input conveyor having input conveyor drive means and an input conveyor belt, coplanar with the output conveyor belt, operable to transport the article in said conveying direction with said face of the transported article sliding along the guiding portion of the guide member, and deliver the article to the entrance of the output conveyor belt, the input conveyor including an input guide member disposed on a side of the input conveyor belt opposite to the guiding portion and facing the guiding portion, and fastened to the input conveyor, the input guide member allowing an opposite face of the box-shaped article transported on the input conveyor belt to slide along it in the conveying direction,
    wherein the input conveyor has further drive means operable to move the input conveyor belt in translation in a direction perpendicular to the conveying direction and make the input guide member to push the transported article against the guiding portion.

2. The apparatus according to claim 1, wherein
    the guiding portion of the guide member is elevated above a conveying plane defined by the output conveyor belt; and
    the further drive means is operable to make a part of the input conveyor belt to pass underneath the guiding portion.

3. The apparatus according to claim 1, wherein an input guide member extension is fastened to the input guide member, aligned with the input guide member, extending above the conveying plane of the output conveyor belt and facing the guide member, said input guide member extension being operable to slidingly guide a box-shaped article transferred from the input conveyor belt to the output conveyor belt by maintaining it in contact with the guide member.

4. The apparatus according to claim 1, further comprising a top guiding member disposed above a portion of the output conveyor belt and top drive means operable to make the top guide member to move in translation in a direction perpendicular to said portion of the output conveyor belt, and make the top guiding member to press on a top face of the box-shaped article transported on said portion of the output conveyor belt.

5. The apparatus according to claim 4, wherein the top guiding member is disposed at the level of the entrance extremity of the output conveyor belt and further extends above a portion of the input conveyor belt.

6. The apparatus according to claim 4, wherein the top guiding member is a top conveyor belt.

7. A printing station for printing on box-shaped articles of various sizes, comprising:
    the apparatus for aligning box-shaped articles of various sizes in a conveying direction on a conveyor belt according to claim 1;
    a print head of a printer operable to print on a face of a box-shaped article aligned by said apparatus on the input conveyor belt, the print head being mounted on a support being one of the guiding portion of the guide member, for printing on a first side face of the box-shaped article abutting said guiding portion, and the input guide member, for printing on a second side face of the box-shaped article opposite to the first side face and abutting said input guide member; and
    a control unit having a processing unit and being connected to the printer, the input conveyor and the output conveyor, operable to control the printer and motion of the input conveyor belt and the output conveyor belt to print data on the face of the box-shaped article abutting the support.

8. A printing station for printing on box-shaped articles of various sizes, comprising:
    the apparatus for aligning box-shaped articles of various sizes in a conveying direction on a conveyor belt according to claim 4;
    a print head of a printer operable to print on a face of a box-shaped article aligned by said apparatus on the output conveyor belt, the print head being mounted on a support being one of the guide member, for printing on a side face of the box-shaped article transported on the output conveyor belt abutting said guide member, and the top guiding member, for printing on a top face of the box-shaped article transported on the output conveyor belt abutting said top guiding member; and
    a control unit having a processing unit and being connected to the printer, the input conveyor, the output conveyor, and the top drive means, operable to control the printer and motion of the input conveyor belt, the output conveyor belt and the top guiding member to print data on the face of the box-shaped article abutting the support.

9. A reading station for reading data on box-shaped articles of various sizes, comprising:
    the apparatus for aligning box-shaped articles of various sizes in a conveying direction on a conveyor belt, according to claim 1;
    a reader operable to read data on a face of a box-shaped article aligned by said apparatus on the input conveyor belt, the reader being mounted on a support being one of the guiding portion of the guide member, for reading data on a first side face of the box-shaped article abutting said guiding portion, and the input guide member, for reading data on a second side face of the box-shaped article opposite to the first side face and abutting said input guide member; and a control unit having a processing unit and being connected to the reader, the input conveyor and the output conveyor, operable to control the reader and motion of the input conveyor belt and the output conveyor belt to read data on the face of the box-shaped article abutting the support.

10. A reading station for reading data on box-shaped articles of various sizes, comprising:
the apparatus for aligning box-shaped articles of various sizes in a conveying direction on a conveyor belt according to claim 4;
a reader operable to read data on a face of a box-shaped article aligned by said apparatus on the output conveyor belt, the reader being mounted on a support being one of the guide member, for reading data on a side face of the box-shaped article transported on the output conveyor belt abutting said guide member, and the top guiding member, for reading data on a top face of the box-shaped article transported on the output conveyor belt abutting said top guiding member; and
a control unit having a processing unit and being connected to the reader, the input conveyor, the output conveyor, and the top drive means, operable to control the reader and motion of the input conveyor belt, the output conveyor belt and the top guiding member to read data on the face of the box-shaped article abutting the support.

11. A labelling station for applying labels on box-shaped articles of various sizes, comprising:
the apparatus for aligning box-shaped articles of various sizes in a conveying direction on a conveyor belt, according to claim 1;
a labelling unit operable to apply a label on a face of a box-shaped article aligned by said apparatus on the input conveyor belt, the labelling unit being fastened to a support being one of the guiding portion of the guide member, for applying the label on a first side face of the box-shaped article abutting said guiding portion, and the input guide member, for applying the label on a second side face of the box-shaped article opposite to the first side face and abutting said input guide member; and
a control unit having a processing unit and being connected to the labeling unit, the input conveyor and the output conveyor, operable to control the labeling unit and motion of the input conveyor belt and the output conveyor belt to apply the label on the face of the box-shaped article abutting the support.

12. A labelling station for applying labels on box-shaped articles of various sizes, comprising:
the apparatus for aligning box-shaped articles of various sizes in a conveying direction on a conveyor belt, according to claim 4;
a labelling unit operable to apply a label on a face of a box-shaped article aligned by said apparatus on the output conveyor belt, the labelling unit being fastened to a support being one the guide member, for applying the label on a side face of the box-shaped article transported on the output conveyor belt abutting said guide member, and the top guiding member, for applying the label on a top face of the box-shaped article transported on the output conveyor belt abutting said top guiding member; and
a control unit having a processing unit and being connected to the labeling unit, the input conveyor, the output conveyor, and the top drive means, operable to control the labeling unit and motion of the input conveyor belt, the output conveyor belt and the top guiding member to apply the label on the face of the box-shaped article abutting the support.

13. A production or distribution line equipped with a belt conveyor for transporting box-shaped articles on a conveyor belt, comprising:
the apparatus for aligning box-shaped articles of various sizes in a conveying direction on a conveyor belt according to claim 1.

14. A production or distribution line equipped with a belt conveyor for transporting box-shaped articles on a conveyor belt, comprising:
the printing station for printing on box-shaped articles of various sizes according to claim 7.

15. A production or distribution line equipped with a belt conveyor for transporting box-shaped articles on a conveyor belt, comprising:
the reading station for reading data on box-shaped articles of various sizes according to claim 9.

16. A production or distribution line equipped with a belt conveyor for transporting box-shaped articles on a conveyor belt, comprising:
the labelling station for applying labels on box-shaped articles of various sizes according to claim 11.

* * * * *